(12) United States Patent
Okino

(10) Patent No.: US 8,175,536 B2
(45) Date of Patent: May 8, 2012

(54) WIRELESS COMMUNICATION SYSTEM, WIRELESS COMMUNICATION APPARATUS AND COMMUNICATION CONTROL METHOD

(75) Inventor: Kenta Okino, Yokohama (JP)

(73) Assignee: Kyocera Corporation, Kyoto (JP)

( * ) Notice: Subject to any disclaimer, the term of this patent is extended or adjusted under 35 U.S.C. 154(b) by 103 days.

(21) Appl. No.: 12/865,383

(22) PCT Filed: Jan. 22, 2009

(86) PCT No.: PCT/JP2009/050957
§ 371 (c)(1),
(2), (4) Date: Jul. 29, 2010

(87) PCT Pub. No.: WO2009/096306
PCT Pub. Date: Aug. 6, 2009

(65) Prior Publication Data
US 2010/0323632 A1  Dec. 23, 2010

(30) Foreign Application Priority Data

Jan. 30, 2008 (JP) .................. 2008-019546

(51) Int. Cl.
*H04B 17/00* (2006.01)
(52) U.S. Cl. .............. 455/67.11; 455/67.16; 455/10; 455/115.1; 375/267
(58) Field of Classification Search .......... 455/67.11, 455/67.16, 10, 115.1, 226.1, 504, 67.13; 375/267, 347; 370/252, 280
See application file for complete search history.

(56) References Cited

U.S. PATENT DOCUMENTS

| | | | |
|---|---|---|---|
| 7,623,587 B2* | 11/2009 | Shim et al. | 375/267 |
| 2005/0047517 A1* | 3/2005 | Georgios et al. | 375/267 |
| 2005/0157807 A1* | 7/2005 | Shim et al. | 375/267 |
| 2009/0093265 A1* | 4/2009 | Kimura et al. | 455/500 |
| 2009/0310701 A1* | 12/2009 | Shim et al. | 375/267 |
| 2010/0150013 A1* | 6/2010 | Hara et al. | 370/252 |
| 2010/0330923 A1* | 12/2010 | Okino | 455/67.11 |
| 2011/0158361 A1* | 6/2011 | Dent et al. | 375/347 |

FOREIGN PATENT DOCUMENTS

| | | |
|---|---|---|
| JP | 2002-314483 | 10/2002 |
| JP | 2005-252834 | 9/2005 |
| JP | 2007-049531 | 2/2007 |
| JP | 2007-116414 | 5/2007 |

OTHER PUBLICATIONS

Office Action (translation) for KR 10-2010-7017194, mailed Jul. 29, 2011, 4 pages.
Mizutani et al., The Institute of Electronics, Information and Communication Engineers Society Taikai Koen Ronbunshu Tsushin 1, Sep. 7, 2005, p. 247.
Tsutsumi et al., Proceedings of the IEICE General Conference, Mar. 3, 2003, p. 776.
International Search Report for PCT/JP2009/050957, mailed on Apr. 21, 2009, 2 pages.

* cited by examiner

*Primary Examiner* — Minh D Dao
(74) *Attorney, Agent, or Firm* — Morrison & Foerster LLP

(57) ABSTRACT

A channel estimation and prediction unit 18 estimates a channel and predicts a plurality of channels for a next transmission slot. An SVD unit 19 performs singular value decomposition on a plurality of channel prediction values. An eigenvalue calculation unit 20 calculates a plurality of eigenvalues in a slot, whereas an eigenmode quality calculation unit 21 calculates a single quality for each eigenmode, considering variation frequency of the eigenvalue in the slot and outputs the quality to a transmission adaptive control unit 22.

5 Claims, 5 Drawing Sheets

WIRELESS COMMUNICATION SYSTEM, WIRELESS COMMUNICATION APPARATUS AND COMMUNICATION CONTROL METHOD

CROSS REFERENCE TO RELATED APPLICATION APPLICATIONS

This application is a U.S. National Phase of International Patent Application No. PCT/JP2009/050957 (filed on Jan. 22, 2009), which claims priority to and the benefit of Japanese Patent Application No. 2008-19546 (filed on Jan. 30, 2008), the entire content of which is contents of these applications are incorporated herein by reference.

TECHNICAL FIELD

The present invention relates to wireless communication systems, wireless communication apparatus and communication control methods using MIMO communication.

BACKGROUND ART

In recent years, when an independent channel called an eigenmode is used by an SVD (Singular Value Decomposition) scheme in the MIMO (Multiple Input Multiple Output) communication using a plurality of antennas in transmission and reception of data, a communication system has dramatically increased the transmission capacity by controlling transmission power and a modulation scheme of each eigenmode in accordance with an eigenvalue of the eigenmode. However, transmission characteristics are seriously deteriorated in the MIMO communication using the eigenmodes, if orthogonality collapses for some reason.

In order to address such a problem, Patent Document 1 suggests, with a Doppler frequency or the likes as known information, to prevent the characteristic deterioration when the orthogonality collapses, by calculating SINR (Signal to Interference plus Noise Ratio) based on the known information and performing control. Patent Document 1 concerns that a slot to estimate a channel differs from a slot to actually transmit data and that the channel varies due to a Doppler variation. As a technique to solve such problems, the document suggests a MIMO eigenmode adaptive transmission system to calculate a value of SINR of the eigenmode based on an estimated value of a channel estimation error because of the Doppler variation, an estimated value of loss of gain of an eigenbeam and an estimated value of interference between eigenbeams, and thereby incorporating an adaptive coding modulation function and a simple and highly effective adaptive power control function in consideration of the actual environment having the Doppler variation.

Patent Document 1: Japanese Patent Application Laid-Open No. 2005-252834

DISCLOSURE OF THE INVENTION

Problems to be Solved by the Invention

On the other hand, a scheme to predict the channel variation has been popularly studied. If a highly accurate channel prediction scheme is provided, the estimated value of loss of gain of the eigenbeam stated above and the estimated value of interference between the eigenbeams becomes small and thus the MIMO eigenmode adaptive transmission is less influenced.

In contrast, if the Doppler variation becomes larger, not only the channel variation between the channel estimation slot and the data transmission slot but also the channel variation within the slot becomes large. If the highly accurate channel variation prediction scheme is sufficiently effective even in such a condition, that is, if the scheme is capable of predicting the channel variation in the data transmission slot and also updating the transmission weight according to a channel predicted in the data transmission slot, the estimated value of loss of gain and the estimated value of the interference between eigenbeams stay small.

However, an eigenvalue of each eigenmode varies within the slot according to the channel variation. FIG. 4 is a graph illustrating a cumulative distribution of eigenvalues, which indicates quality of each eigenmode, when the channel prediction value is appropriate, whereas FIG. 5 is a graph exemplifying variation of the eigenvalue of each eigenmode within the slot. FIG. 4 and FIG. 5 show that a higher eigenmode with large eigenvalues has a smaller variation of the eigenvalue and a lower eigenmode with small eigenvalues has a larger variation of the eigenvalue.

In such a condition, if quality of the eigenmode (SINR) is calculated based on an average of eigenvalues of each eigenmode in the slot and used for the transmission adaptive control, numerous symbols with eigenvalues lower than assumed are generated particularly in the lower eigenmode, leading to deterioration of the transmission characteristics.

In order to address such an issue, it is an object of the present invention to provide wireless communication systems, wireless communication apparatus and communication control methods capable of efficiently executing adaptive control of MIMO and the likes even if a terminal moves at a high speed causing significant channel variations.

SUMMARY OF THE INVENTION

In order to achieve the above object, the present invention is characterized in that a wireless communication system for performing wireless communication between a transmission apparatus and a reception apparatus via an eigenmode includes: a channel prediction unit for calculating a channel prediction value of the transmission apparatus at transmission based on channel estimation between the transmission apparatus and the reception apparatus; an eigenvalue calculation unit for calculating a plurality of eigenvalues in a predetermined period based on the channel prediction value calculated by the channel prediction unit; an eigenmode quality calculation unit for calculating a value indicating quality of the eigenmode in the predetermined period based on the plurality of eigenvalues calculated by the eigenvalue calculation unit; and a control unit for controlling predetermined processing at transmission based on the value calculated by the eigenmode quality calculation unit, wherein the eigenmode quality calculation unit controls the value indicating the quality of the eigenmode in accordance with variation frequency of the plurality of eigenvalues, in the predetermined period, calculated by the eigenvalue calculation unit.

It is preferred that the eigenmode quality calculation unit calculates the value indicating the quality of the eigenmode based on an average value of the plurality of eigenvalues in the predetermined period and calculates the value indicating the quality of the eigenmode based on a value equal to or smaller than the average value in accordance with the variation frequency of the plurality of eigenvalues in the predetermined period. In addition, it is preferred that the eigenmode quality calculation unit controls a decrease value of the average value in accordance with the variation frequency.

In addition, the present invention is characterized in that a wireless communication apparatus for performing wireless communication via an eigenmode includes: a channel prediction unit for calculating a channel prediction value at transmission based on channel estimation between the wireless communication apparatus and a counterpart wireless communication apparatus; an eigenvalue calculation unit for calculating a plurality of eigenvalues in a predetermined period based on the channel prediction value calculated by the channel prediction unit; an eigenmode quality calculation unit for calculating a value indicating quality of the eigenmode in the predetermined period based on the plurality of eigenvalues calculated by the eigenvalue calculation unit; and a control unit for controlling predetermined processing at transmission based on the value calculated by the eigenmode quality calculation unit, wherein the eigenmode quality calculation unit controls the value indicating the quality of the eigenmode in accordance with variation frequency of the plurality of eigenvalues, in the predetermined period, calculated by the eigenvalue calculation unit.

Moreover, the present invention is characterized in that a communication control method of a wireless communication system for performing wireless communication between a transmission apparatus and a reception apparatus via an eigenmode includes the steps of: calculating a channel prediction value of the transmission apparatus at transmission based on channel estimation between the transmission apparatus and the reception apparatus; calculating a plurality of eigenvalues in a predetermined period based on the channel prediction value; calculating a value indicating quality of the eigenmode in the predetermined period based on the plurality of eigenvalues, and controlling the value indicating the quality of the eigenmode in accordance with variation frequency of the plurality of eigenvalues calculated in the predetermined period; and controlling predetermined processing at transmission based on the value indicating the quality of the eigenmode controlled.

Effect of the Invention

The present invention can effectively execute adaptive control of MIMO and the likes by considering the variation of the eigenvalue in a transmission slot, even if the channel variation is significant because of high speed movement of a terminal and the likes. It is thus possible to contribute to improvement of the high speed moving performance.

DESCRIPTION OF EMBODIMENTS

Figure 1:
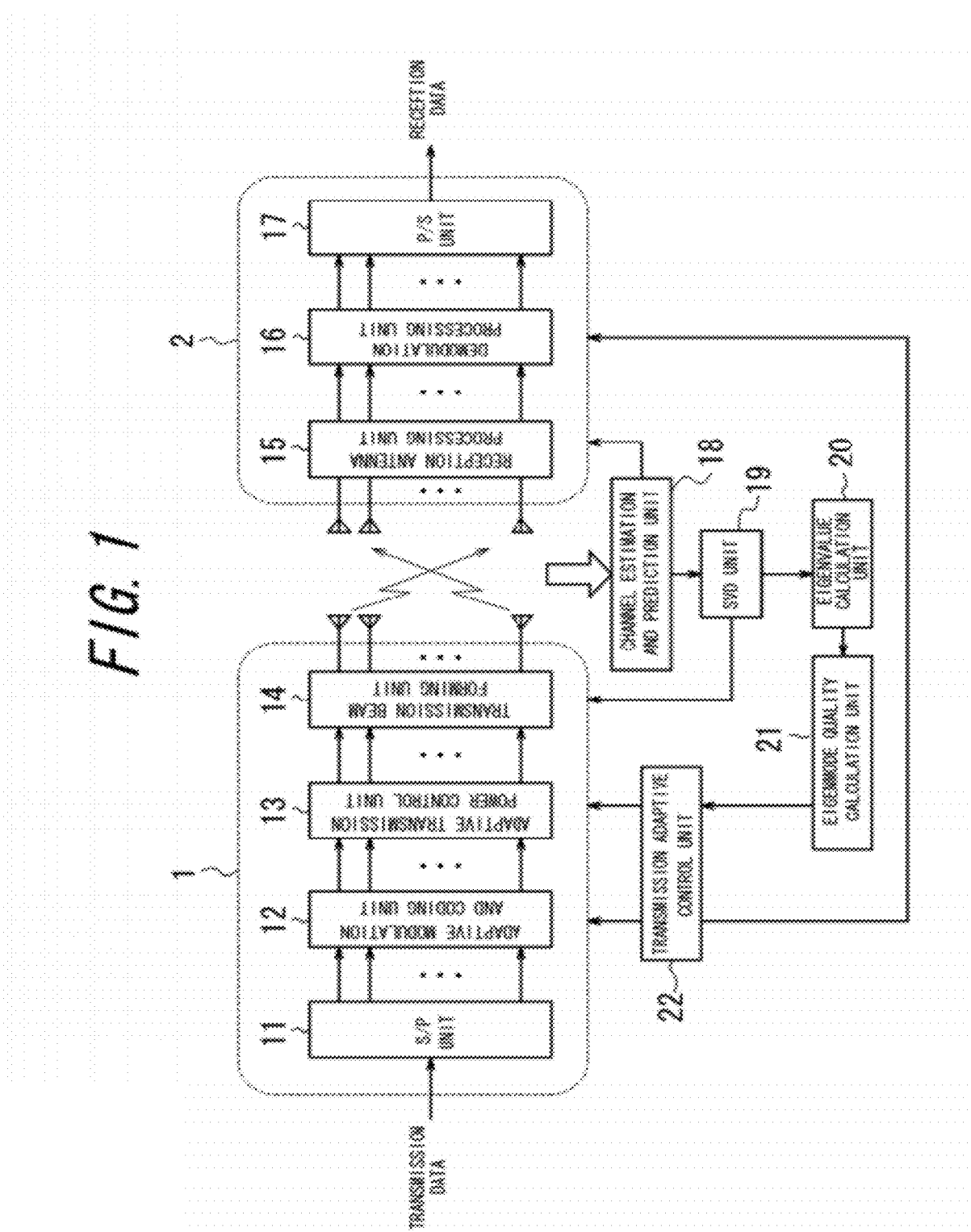
FIG. 1 is a diagram illustrating a basic configuration of a wireless communication system according to the present invention.

A preferred embodiment of the present invention will be described with reference to the accompanying drawings. FIG. 1 is a diagram illustrating a basic configuration of a wireless communication system according to the present invention. As shown in FIG. 1, a transmission apparatus 1 is provided with an S/P unit 11, an adaptive modulation and coding unit 12, an adaptive transmission power control unit 13, and a transmission beam forming unit 14, whereas a reception apparatus 2 is provided with a reception antenna processing unit 15, a demodulation processing unit 16, and a P/S unit 17. A channel estimation unit 18, an SVD unit 19, an eigenvalue calculation unit 20, an eigenmode quality calculation unit 21, and a transmission adaptive control unit 22 may be provided to either the transmission apparatus 1 or the reception apparatus 2.

The S/P unit 11 performs serial-to-parallel conversion on transmission data and outputs transmission data for each eigenmode. The adaptive modulation and coding unit 12 modulates and encodes the transmission data of each eigenmode in accordance with output of the transmission adaptive control unit 22. The adaptive transmission power control unit 13 controls transmission power of a transmission signal of each eigenmode output from the adaptive modulation and coding unit 12, in accordance with the output from the transmission adaptive control unit 22. The transmission beam forming unit 14 forms a transmission eigenbeam by multiplying a transmission signal output from the adaptive transmission power control unit 13 by a transmission weight output from the SVD unit 19 and also multiplexes the signal for each transmission antenna.

A MIMO channel is formed between a plurality of transmission antennas and a plurality of reception antennas. The reception antenna processing unit 15 performs spatial filtering by calculating a reception weight based on a result of channel estimation output from the channel estimation and prediction unit 18, or extracts the signal of each eigenmode by performing a maximum likelihood reception process. The demodulation processing unit 16 performs error correction demodulation and the likes on the signal of each eigenmode based on output information from the transmission adaptive control unit 22 and outputs reception data. The P/S unit 17 performs parallel-to-serial conversion on the reception data of each eigenmode.

The channel estimation and prediction unit 18 estimates a channel between the transmission apparatus 1 and the reception apparatus 2 and calculates a plurality of channel prediction values at transmission based on the channel estimated. The SVD unit 19 performs singular value decomposition on each of the plurality of channel prediction values calculated by the channel estimation and prediction unit 18. The eigenvalue calculation unit 20 calculates an eigenvalue in a predetermined period (in one slot) based on a plurality of singular values of each eigenmode obtained from the SVD unit 19. The eigenmode quality calculation unit 21 calculates a value indicating quality of the eigenmode in the predetermined period based on the plurality of eigenvalues calculated by the eigenvalue calculation unit 20 and controls the value indicating the quality of the eigenmode in accordance with variation frequency of the plurality of eigenvalues calculated in a predetermined period. The transmission adaptive control unit 22 controls predetermined processing (transmission power control and/or modulation and coding control) at transmission based on the value calculated by the eigenmode quality calculation unit 21.

In addition, the eigenmode quality calculation unit 21 calculates the value indicating the quality of the eigenmode based on an average value of the plurality of eigenvalues in the predetermined period, calculates the value indicating the quality of the eigenmode based on a value equal to or smaller than the average value in accordance with the variation frequency of the plurality of eigenvalues in the predetermined period, and, furthermore, controls a decrease value of the average value in accordance with the variation frequency.

Figure 2:
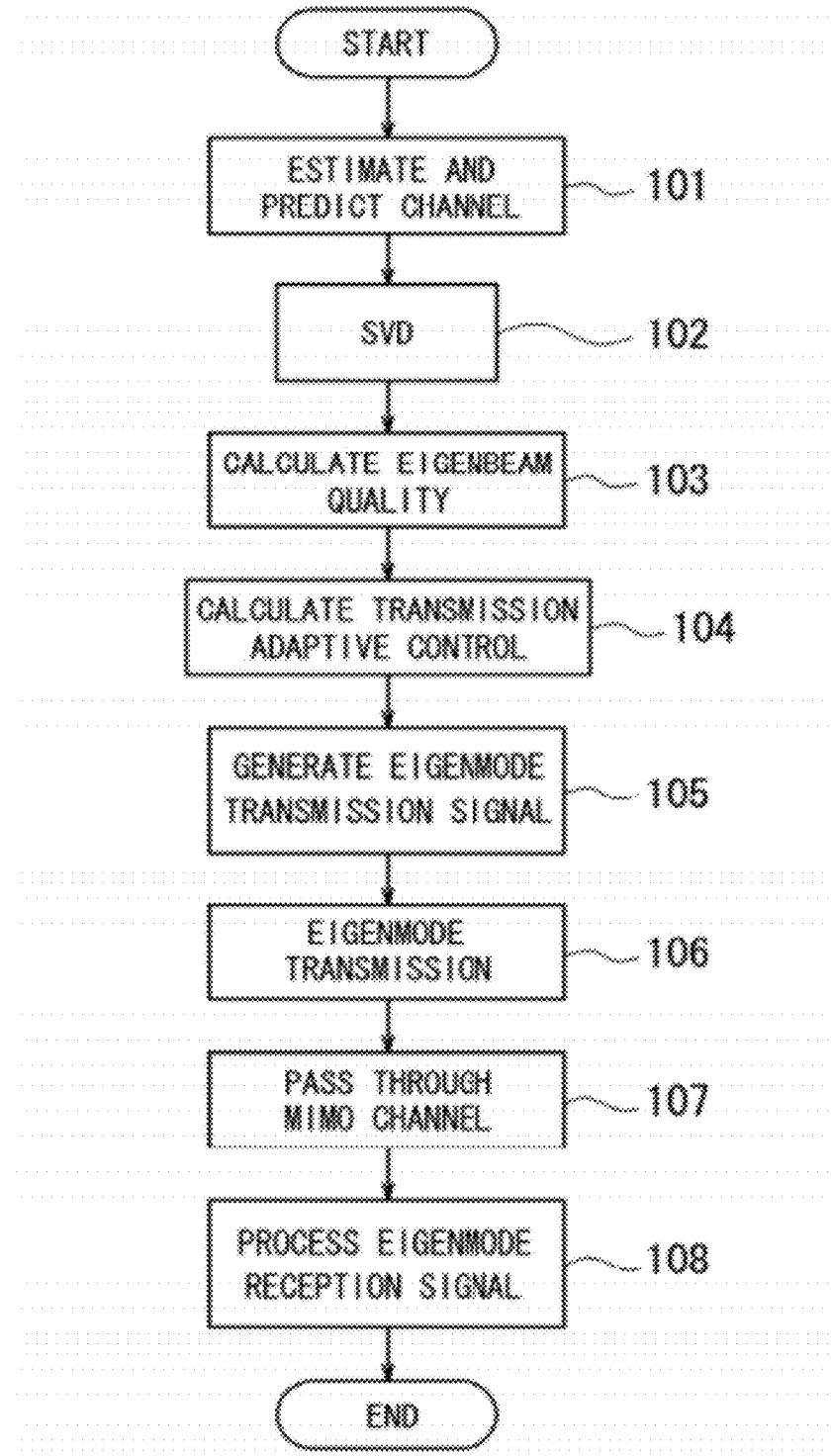
FIG. 2 is a flowchart illustrating an operation of the present invention.

FIG. 2 is a flowchart illustrating an operation of the wireless communication system according to the present invention. This flowchart assumes that the channel varies because of movement of a terminal and the likes.

Figure 3:
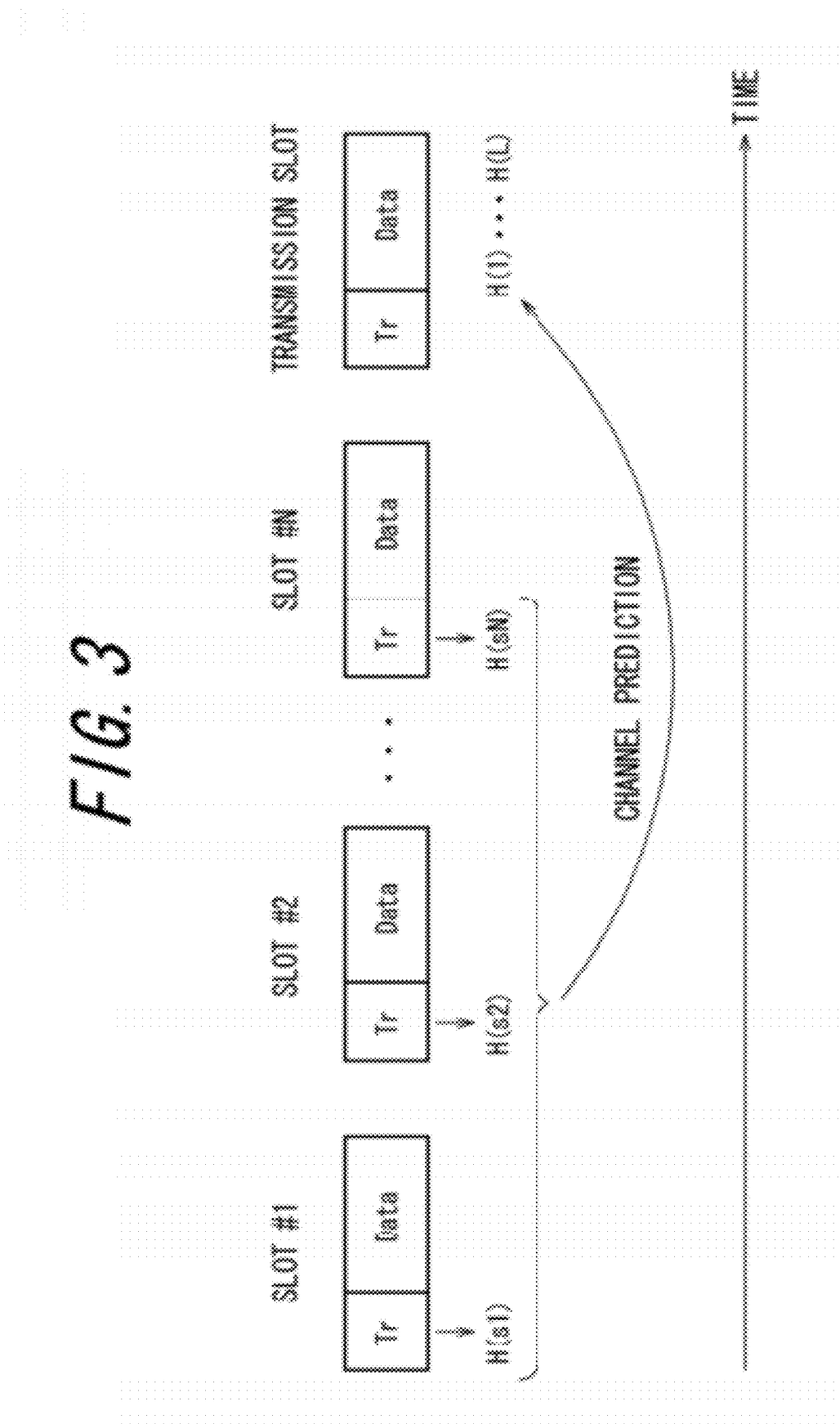
FIG. 3 is a diagram illustrating a state in which a plurality of channels is predicted to a transmission slot based on a plurality of channel estimation values.

First, the channel estimation and prediction unit 18 performs channel estimation and performs channel prediction of a slot to actually transmit data (step 101). The channel estimation and prediction unit 18 may be provided at either a transmission side or a reception side. For FDD (Frequency Division Duplex), for example, the channel estimation and prediction unit 18 is provided at the reception side, whereas, for TDD (Time Division Duplex), the channel estimation and prediction unit 18 is provided at both of the transmission side and the reception side. It is also possible to design estimation and prediction separately at the reception side and at the transmission side. For example, a channel estimated at the reception side is fed back to the transmission side, and the transmission side predicts a channel of a slot to actually transmit data based on a channel estimation value fed back. Not a single but a plurality of channels is predicted for one slot. FIG. 3 is a diagram illustrating a state in which channel estimations are performed from training signals (Tr) of channel estimation slots and a plurality of channels are predicted for a transmission slot from a plurality of channel estimation values.

Next, the SVD unit 19 performs singular value decomposition on a channel matrix (step 102). Since a plurality of channels is predicted for a single slot by the channel estimation and prediction unit 18, there are a plurality of results for the slot by the SVD.

If the number of transmission antennas is $N_T$ and the number of reception antennas is $N_R$, the channel matrix predicted by the channel estimation and prediction unit 18 is a matrix $N_T \times N_R$ and expressed as:

$$H(l) \quad \text{[Formula 1]}$$

where l is a sample number of a transmission slot, and the number of samples is the number of predicted channels, L. L is the number of symbols of the single slot at maximum. The channel matrix may be processed with singular value decomposition as shown by:

$$H(l)=U(l)\Sigma(l)V^H(l) \quad \text{[Formula 2]}$$

$$\Sigma(l) \quad \text{[Formula 3]}$$

is a diagonal matrix having singular values indicating transfer function of $M=\min[N_T, N_R]$ orthogonal channels (eigenmodes) as elements and shown as follows:

$$\Sigma(l)=\mathrm{diag}[\sqrt{\lambda_1(l)}, \ldots, \sqrt{\lambda_M(l)}] \quad \text{[Formula 4]}$$

where it is assumed that $\Lambda_m(l)$ is sorted in descending order.

Next, the eigenvalue calculation unit 20 calculates a plurality of eigenvalues in the slot based on a plurality of singular values of each eigenmode obtained from the SVD unit 19, and the eigenmode quality calculation unit 21 calculates a single quality (effective SNR (Signal to Noise Ratio)) considering the frequency of the variation (dispersion, spread, variation) of the eigenvalues in the slot for each eigenmode (step 103). It is to be noted that there is basically one result of calculation for each eigenmode per slot. This is because, in order to adopt multiple transmission adaptive controls in the slot, it is necessary to inform the reception side of control information but increase of the control information decreases throughput. An SNR is calculated for the eigenvalue of the eigenmode at m-th by the following formula:

$$SNR_m(l) = \frac{\lambda_m(l)}{\sigma^2} \quad \text{[Formula 5]}$$

where $\sigma^2$ indicates noise power.

Figure 4:
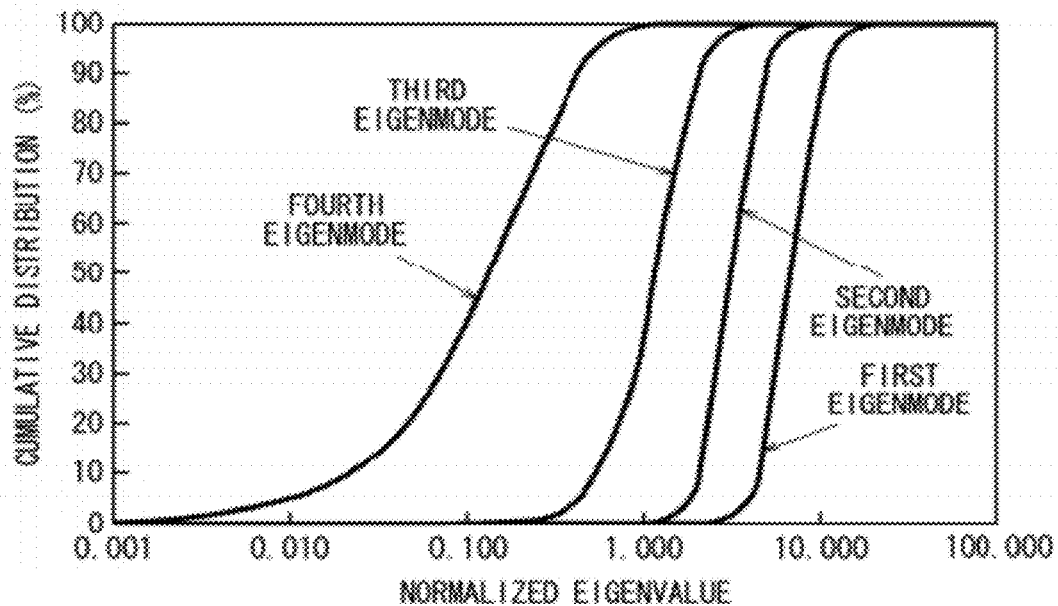
FIG. 4 is a graph illustrating a cumulative distribution of eigenvalues as quality of each eigenmode.
Figure 5:
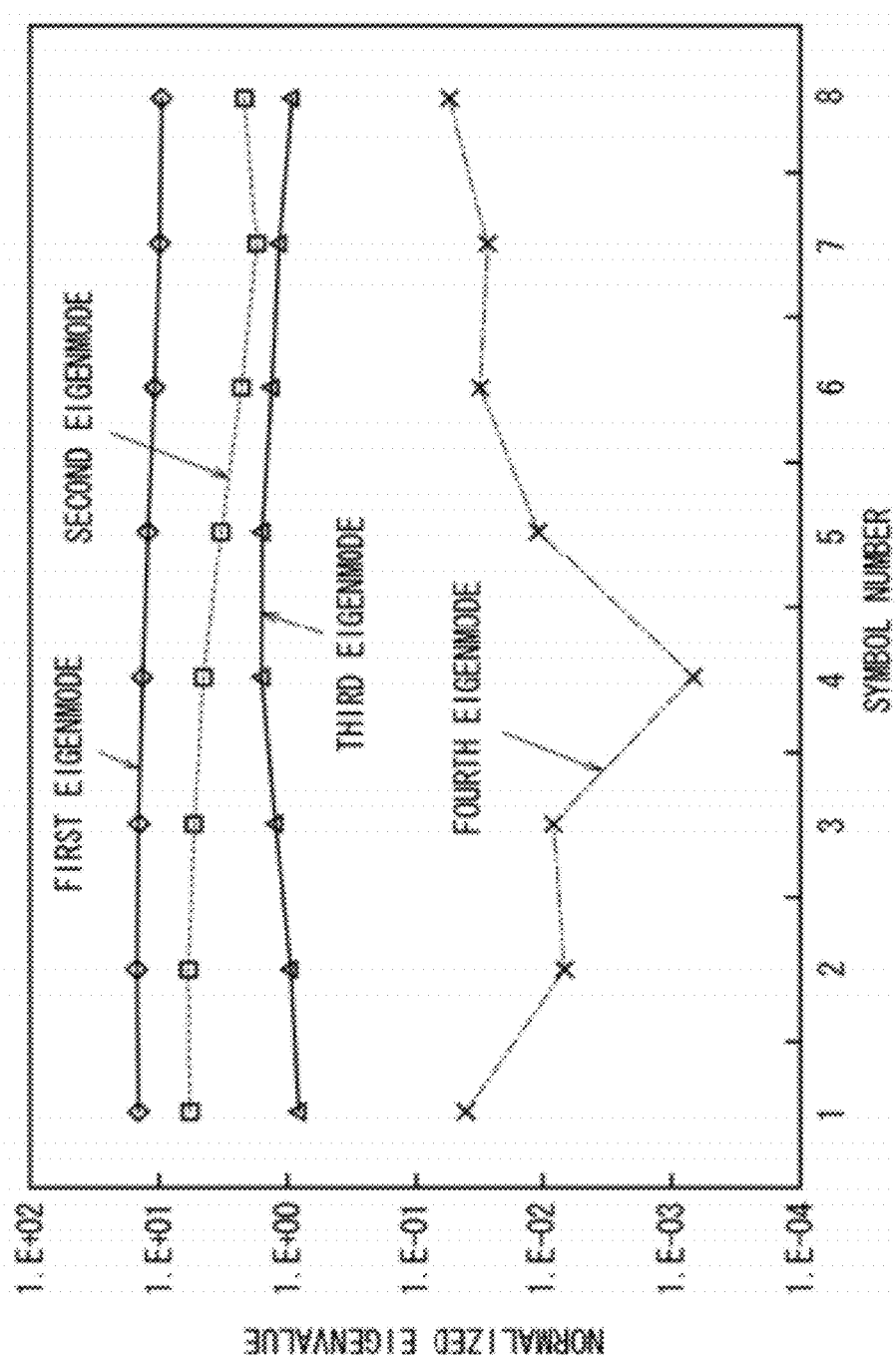
FIG. 5 is a graph exemplifying variation of the eigenvalue of each eigenmode in the slot.

If a Doppler variation is small, there is no problem to obtain the effective SNR by calculating an average value of SNRs from L eigenvalues. However, if the Doppler variation is large, the number of symbols of SNRs lower than the average value is increased. This is more significant as the eigenmode is lower, as shown in FIG. 4 and FIG. 5. If the transmission adaptive control unit 22 does not expect a large variation of the eigenvalue in the slot, it causes characteristic deterioration especially in the lower eigenmode.

In order to address such an issue, the effective SNR (Eff. $SNR_m[dB]$) of the eigenmode at m-th is calculated as follows, for example:

$$Ave.SNR_m = 10\log 10\left(\frac{1}{L}\sum_{l=0}^{L-1}\frac{\lambda_m(l)}{\sigma^2}\right) \quad \text{[Formula 6]}$$

$$SD.SNR_m = \sqrt{\frac{1}{L}\sum_{l=0}^{L-1}\left|10\log 10\left(\frac{\lambda_m(l)}{\sigma^2}\right) - Ave.SNR_m\right|^2}$$

$$Eff.SNR_m = Ave.SNR_m - \alpha SD.SNR_m$$

where Ave. $SNR_m[dB]$ is an average value of the eigenvalues, whereas SD. SNRm[dB] is a standard deviation. $\alpha$ is a constant and preset to maximize the performance by adaptive transmission control.

The eigenmode quality calculation unit 21, by using a value calculated by subtracting the standard deviation from the average value of the eigenvalues as a result of calculation of quality as stated above, for example, can reduce a probability of generation of symbols of qualities lower than expected and thus obtain the desired communication quality even in a lower eigenmode. The eigenmode quality calculation unit 21 may use a value calculated by subtracting a difference between a maximum value and a minimum value and the likes from the average value of the eigenvalues as the result of calculation of quality.

That is, the eigenmode quality calculation unit 21 reduces a value lower from the average of eigenvalues in a slot as the variation frequency of the eigenvalues is larger in the slot.

Next, based on the effective SNR stated above, the transmission adaptive control unit 22 calculates the number of eigenmodes to be used, a coded modulation scheme of each eigenmode and transmission power (step 104). In addition, the adaptive modulation and coding unit 12 modulates and encodes the transmission data of each eigenmode in accordance with a result of calculation by the transmission adaptive control unit 22, and the adaptive transmission power control unit 13 controls the transmission power of the transmission signal of each eigenmode output by the adaptive modulation and coding unit 12 in accordance with the result of calculation by the transmission adaptive control unit 22, so as to generate an eigenmode transmission signal (step 105).

The eigenmode transmission signal generated is multiplied by the transmission weight output from the SVD unit 19 in the transmission beam forming unit 14 so as to be a transmission eigenbeam and transmitted from a transmission antenna (step 106). The eigenbeam is propagated through the MIMO channel formed between the plurality of transmission antennas and the plurality of reception antennas (step 107).

The reception side processes a reception signal of the eigenmode (step 108). That is, the reception antenna processing unit 15 performs the spatial filtering by calculating the reception weight based on a result of channel estimation output by the channel estimation and prediction unit 18, or performs a maximum likelihood reception process so as to extract the signal of each eigenmode. In addition, the demodulation processing unit 16 performs processes such as error correction decoding of the signal of each eigenmode according to a result of calculation by the transmission adaptive control unit 22.

It is to be noted that the SVD unit is not necessarily required to perform singular value decomposition. For example, the SVD unit may perform a process to find a code number of a weight to maximize the eigenvalue from a predetermined group of weights, called a code book. That is, the SVD unit may perform a process to find a transmission weight and the eigenvalue (singular value) of the eigenmode at that time.

As described above, according to the present invention, it is possible to appropriately perform the transmission adaptive control by considering the variation of the eigenvalues in a transmission slot at calculation of the quality, even in an environment with a significant channel variation because of the Doppler variation and the likes.

The invention claimed is:

1. A wireless communication system for performing wireless communication between a transmission apparatus and a reception apparatus via an eigenmode comprising:
   a channel prediction unit for calculating a channel prediction value of the transmission apparatus at transmission based on channel estimation between the transmission apparatus and the reception apparatus;
   an eigenvalue calculation unit for calculating a plurality of eigenvalues in a predetermined period based on the channel prediction value calculated by the channel prediction unit;
   an eigenmode quality calculation unit for calculating a value indicating quality of the eigenmode in the predetermined period based on the plurality of eigenvalues calculated by the eigenvalue calculation unit; and
   a control unit for controlling predetermined processing at transmission based on the value calculated by the eigenmode quality calculation unit,
   wherein the eigenmode quality calculation unit controls the value indicating the quality of the eigenmode in accordance with variation frequency of the plurality of eigenvalues, in the predetermined period, calculated by the eigenvalue calculation unit.

2. The wireless communication system according to claim 1, wherein the eigenmode quality calculation unit calculates the value indicating the quality of the eigenmode based on an average value of the plurality of eigenvalues in the predetermined period, and
   calculates the value indicating the quality of the eigenmode based on a value equal to or smaller than the average value in accordance with the variation frequency of the plurality of eigenvalues in the predetermined period.

3. The wireless communication system according to claim 2, wherein the eigenmode quality calculation unit controls a decrease value of the average value in accordance with the variation frequency.

4. A wireless communication apparatus for performing wireless communication via an eigenmode comprising:
   a channel prediction unit for calculating a channel prediction value at transmission based on channel estimation between the wireless communication apparatus and a counterpart wireless communication apparatus;
   an eigenvalue calculation unit for calculating a plurality of eigenvalues in a predetermined period based on the channel prediction value calculated by the channel prediction unit;
   an eigenmode quality calculation unit for calculating a value indicating quality of the eigenmode in the predetermined period based on the plurality of eigenvalues calculated by the eigenvalue calculation unit; and
   a control unit for controlling predetermined processing at transmission based on the value calculated by the eigenmode quality calculation unit,
   wherein the eigenmode quality calculation unit controls the value indicating the quality of the eigenmode in accordance with variation frequency of the plurality of eigenvalues, in the predetermined period, calculated by the eigenvalue calculation unit.

5. A communication control method of a wireless communication system for performing wireless communication between a transmission apparatus and a reception apparatus via an eigenmode comprising the steps of:
   calculating a channel prediction value of the transmission apparatus at transmission based on channel estimation between the transmission apparatus and the reception apparatus;
   calculating a plurality of eigenvalues in a predetermined period based on the channel prediction value calculated;
   calculating a value indicating quality of the eigenmode in the predetermined period based on the plurality of eigenvalues calculated, and controlling the value indicating the quality of the eigenmode in accordance with variation frequency of the plurality of eigenvalues calculated in the predetermined period; and
   controlling predetermined processing at transmission based on the value indicating the quality of the eigenmode controlled.

* * * * *